United States Patent
Bronk, III

[11] Patent Number: 5,992,193
[45] Date of Patent: Nov. 30, 1999

[54] VEHICLE ANTI-THEFT DEVICE

[76] Inventor: Hank Bronk, III, 8138 Graystone St., Sunland, Calif. 92806

[21] Appl. No.: 08/877,590

[22] Filed: Jun. 17, 1997

Related U.S. Application Data

[60] Provisional application No. 60/022,430, Aug. 6, 1996.

[51] Int. Cl.[6] .......................... B60R 25/00; E05B 65/12
[52] U.S. Cl. .................................. 70/253; 70/258; 70/226
[58] Field of Search .............................. 70/225, 226, 34, 70/253, 256, 257, 237, 258

[56] References Cited

U.S. PATENT DOCUMENTS

| | | | |
|---|---|---|---|
| 1,159,041 | 11/1915 | Jones et al. | 70/253 |
| 1,223,825 | 4/1917 | Pabst | 70/253 |
| 1,495,115 | 5/1924 | Setterberg | 70/34 |
| 4,622,833 | 11/1986 | Shepard | 70/226 |
| 4,637,234 | 1/1987 | Mielonen | 70/34 |
| 4,683,737 | 8/1987 | Armstrong | 70/256 |
| 4,711,106 | 12/1987 | Johnson | 70/34 |
| 4,977,974 | 12/1990 | Brown | 70/226 |
| 5,085,061 | 2/1992 | Maudsley | 70/253 |

FOREIGN PATENT DOCUMENTS

| | | | |
|---|---|---|---|
| 626632 | 12/1926 | France | 70/253 |
| 593652 | 10/1947 | United Kingdom | 70/226 |

OTHER PUBLICATIONS

Deadbolt Hitch Lock, CT Johnson Enterprises Dec. 31, 1986.

*Primary Examiner*—Darnell M. Boucher
*Attorney, Agent, or Firm*—Louis J. Bachand

[57] ABSTRACT

A vehicle anti-theft device uses a rigid bar removably set between a turned vehicle wheel and the wheel well to block movement of the vehicle and prevent its theft. The anti-theft device consists of a rigid rod attached to a bracket by a locking pin locked through mating transverse aperatures in the rod and bracket. The bracket is mountable in the wheel well of the vehicle.

5 Claims, 1 Drawing Sheet

VEHICLE ANTI-THEFT DEVICE

REFERENCE TO RELATED APPLICATIONS

This application claims the benefit of Provisional Application Ser. No. 60/022,430 filed Aug. 6, 1996.

TECHNICAL FIELD

This invention relates to a vehicle anti-theft device, and more particularly to an anti-theft device for vehicles which deters theft by blocking repositioning of the wheels from a turning orientation, and protects from outside the vehicle.

BACKGROUND

The number of vehicle thefts in the United States and indeed around the world continues to increase despite efforts by manufacturers and after-market businesses to alarm vehicles and even disable them in the event of attempted theft. Devices, which rely on electronics often, foil the owner of the car as well as the would-be thief. Mechanical devices, such as steering wheel bars which prevent rotation of the steering wheel sufficient to steer the vehicle, can be overcome by sawing through the steering wheel, or freezing and breaking the device or its lock mechanism.

SUMMARY OF THE INVENTION

It is an object therefore to provide a vehicle anti-theft device which does not suffer the deficiencies of the prior art. It is another object to provide such a device which blocks vehicle wheel movement rather than steering wheel movement. A further object is to provide a vehicle anti-theft device which is simple, but rugged, in construction, which fits between the wheel well wall and a turned out vehicle wheel, and is easily installed. Yet another object is to provide a vehicle anti-theft device in which a bar is held rigidly against an out turned portion of a wheel blocking steering of the vehicle, and thereby preventing theft of the vehicle, the bar being temporarily mounted to a bracket fixed in the wheel well, and locked.

These and other objects of the invention to become apparent hereinafter are realized with the invention vehicle anti-theft device comprising a cooperating bar and bracket adapted to be fixed in a wheel well with the bar engaging an angularly disposed vehicle wheel.

In particular embodiments: the invention vehicle anti-theft device further includes a lock assembly locking said bracket and bar together; the bracket comprises a wall member arranged and sized to receive the bar; the bar comprises a rigid element having a wheel-engaging portion at one end and an engagement locus, such as a transverse bore through the bar end remote to the vehicle wheel, and there is further included a lock element, such as a locking pin shiftable, e.g. axially, in the bar transverse bore; the bracket comprises a wall member sized to receive the bar, the bracket wall member defining a locking pin receiving bore for positioning the bar endwise in the bracket and positioned for engagement with the out turned portion of the angularly disposed wheel; the locking pin extending transversely through the bar bore, the bracket bore supporting the locking pin against passage through the bar bore in the assembled condition of the bar and bracket, and a pair of jaws is provided within the bracket adapted to lock the locking pin therein against movement.

In this and like embodiments locking pin defines a cammed surface for engaging the jaws; And there is also included a lock selectively locking the jaws in locking pin-engaged relation.

In a further embodiment, the invention provides a vehicle anti-theft device comprising a bar sized to bridge the gap between an out turned portion of a vehicle wheel and the surrounding wheel well, a wheel well bracket mounting the bar in out turned wheel portion movement-blocking relation, and means to lock the bar and bracket together against unauthorized removal of the bar.

The invention further contemplates the method of blocking theft of a vehicle, including disposing a vehicle front wheel at an angle to have a wheel out turned portion, interposing a rigid bar between the wheel out turned portion and the wheel well surrounding the wheel, and locking the bar against unauthorized removal.

BRIEF DESCRIPTION OF THE DRAWING

The invention will be further described in conjunction with the attached drawing in which.

DETAILED DESCRIPTION

Figure 1:
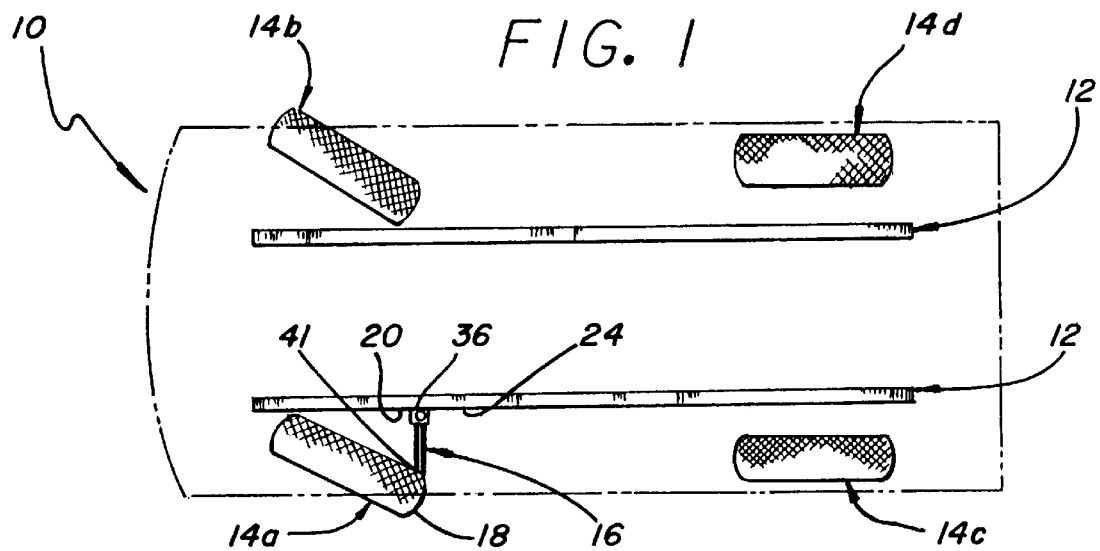
FIG. 1 is a schematic view of a vehicle with the invention anti-theft device in place; and, FIG. 2 is a fragmentary, perspective view of the device in the installed condition.

With reference now to the drawings in detail, in FIG. 1 a vehicle chassis 10 such as that of a Suburban, Expedition, Bronco, Navigator, Jeep, Land Rover, or other truck or sport utility vehicle having a large wheel-to-wheel-well clearance for ease of handling the present anti-theft device, preferably, is shown having frame 12 and wheels 14a, b, c and d. The left front wheel 14a is turned out to approximately its maximum angle. The invention anti-theft device 16 is interposed between the out turned portion 18 of the wheel 14a and the frame 12, or more specifically the inboard portion 20 of the wheel well, See FIG. 2, or other portion of the vehicle which allows rigid mounting of the device.

Figure 2:
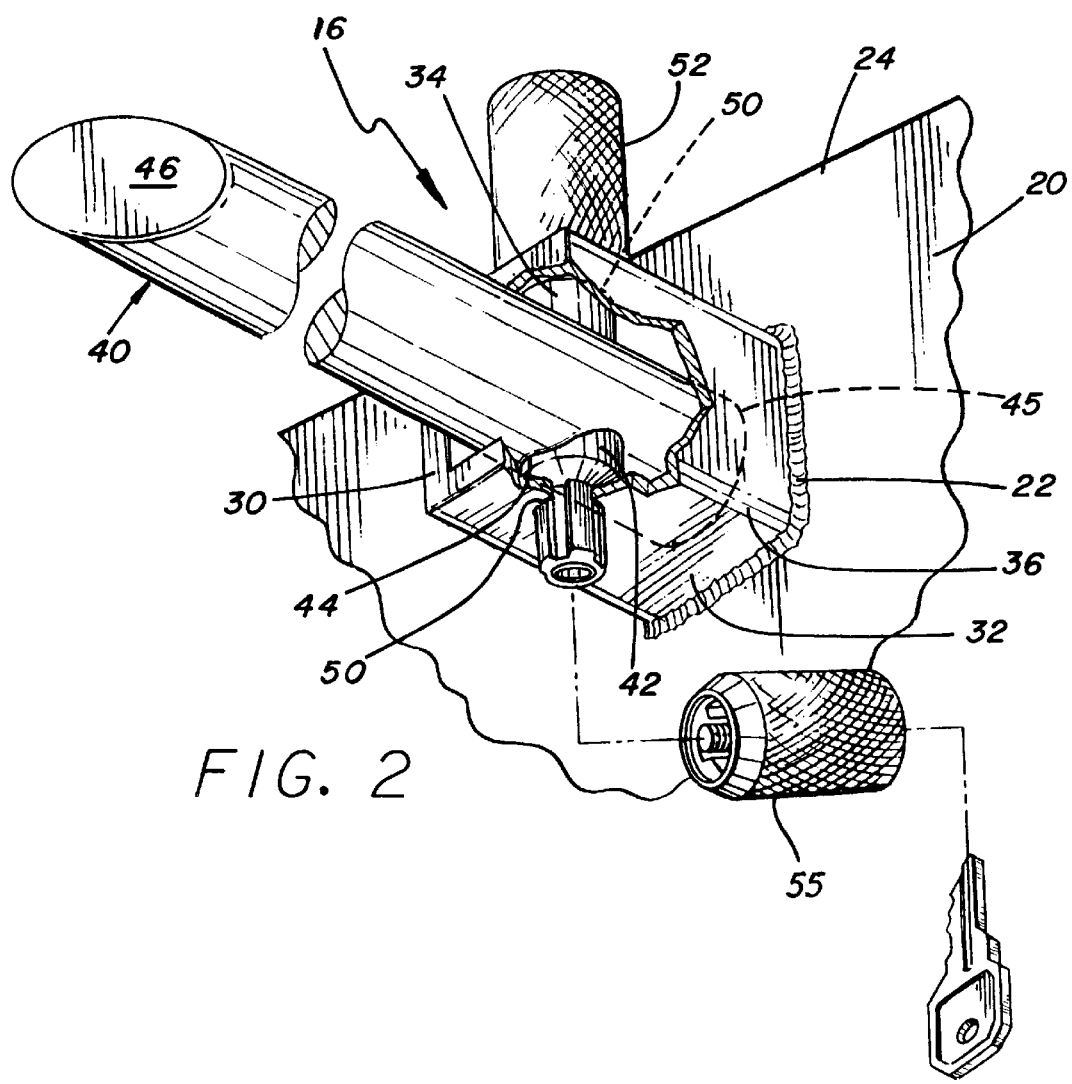

With reference now to FIG. 2, the device 16 is welded or otherwise irremovably attached at 22 to a metal member 24 which is suitably the inboard portion 20 of the wheel well, or a vehicle frame portion at the wheel well.

The vehicle anti-theft device 16 comprises a bracket 30 and a bar 40. Both bracket 30 and bar 40 are preferably fabricated of tough steel or aluminum stock. The bracket 30 can be of any effective configuration for retaining to bar 40 in place, but for ease of manufacture and use it is preferred that the bracket have a U-shaped wall 32 open at the front 34 and rear 36, the rear being welded onto the vehicle 10. The orientation of the bracket 30 is such as allows the frontal insertion of a rigid bar 40 endwise into the bracket. The bar 40 is sized to bridge the space 41 (FIG. 1) between the bracket 30 and the out turned portion 18 of the wheel 14a. The bar 40 will thus block return of the wheel 14a, and necessarily wheel 14b, to a straight-ahead orientation, and thus prevent the vehicle from moving in anything but a circle, a traveling condition guaranteed to thwart theft even when driving onto a flatbed trailer or truck is attempted.

The bar 40 is locked to the bracket 30 by any effective means. Preferably in the embodiment illustrated, locking is by use of a locking pin 42 which is axially shiftable in transverse bore 44 in the inner end 45 of the bar. The bar outer end 46 is blunt and rounded to avoid damaging the tire of wheel 14a. Bar 40 inner end 45, which has bore 44 therein, is inserted into the open front 34 of the bracket 30. Pin 42 is inserted through a bore 50 in bracket wall 32 to a depth determined by the size and location of head 52 on the pin, the head being unable to pass through the bore 50, and locked there with keeper 55. In this assembled condition of the device the bar 40 is extended horizontally out toward and to the wheel 14a out turned portion 18, blocking inward movement of that portion. See FIG. 1. Other key and locking systems can be used.

During installation of the device 16, the bracket 30 is welded or otherwise fixed to the vehicle at the appropriate height and orientation. In use, the vehicle owner when parking turns the front wheels to an extreme position, See FIG. 1. The owner inserts the bar 40 at the horizontal, inserts the locking pin 42 from the bottom through the bar bore 44 and the bracket wall bore 50 in registration with the bar bore. The locking pin head 52 is threaded on and holds the pin 42 in place, until locked with keeper 55. To disengage the device the several steps are reversed.

The foregoing objects are thus met.

I claim:

1. An anti-theft device for a vehicle having a frame, a pair of rear wheels, and a pair of front wheels movable within front wheel wells, said device consisting of a bar having a front wheel engaging portion at one end and a bar bore extending transversely through the other end, a bracket having a wall member mountable in said wheel well and having a wall member bore registered with said bar transverse bore in the wheel-engaged condition of said one end, and a lock assembly including a pin extending through said bar and wall member bores to maintain said bar in engagement with a wheel to prevent vehicle theft.

2. The vehicle anti-theft device according to claim 1 in which said bracket is adapted to be welded to said wheel well.

3. The vehicle anti-theft device according to claim 1, in which said locking pin is axially shiftable in said bar and wall member bores.

4. The vehicle anti-theft device according to claim 3, in which said wall member has a four-sided open-ended structure shaped and sized to receive said other end of the bar to a predetermined depth, opposed walls of said structure defining said wall member bore in registration with said bar transverse bore in the received condition of said other end for receiving said pin through said wall member bore and said bar transverse bore.

5. The vehicle anti-theft device according to claim 4, in which said wall member supports said pin against passage through said transverse bar bore in the assembled condition of said bar and bracket.

* * * * *